(12) United States Patent
Chen et al.

(10) Patent No.: US 8,281,399 B1
(45) Date of Patent: Oct. 2, 2012

(54) SYSTEMS AND METHODS FOR USING PROPERTY TABLES TO PERFORM NON-ITERATIVE MALWARE SCANS

(75) Inventors: Joseph Chen, Los Angeles, CA (US); Allen Hair, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/433,259

(22) Filed: Mar. 28, 2012

(51) Int. Cl.
*G06F 21/00* (2006.01)
(52) U.S. Cl. .................................................. 726/24
(58) Field of Classification Search .............. 726/24
See application file for complete search history.

(56) References Cited

U.S. PATENT DOCUMENTS

| | | | | |
|---|---|---|---|---|
| 5,860,005 A * | 1/1999 | Inoue | ............................. | 717/101 |
| 2005/0081053 A1* | 4/2005 | Aston et al. | .................... | 713/200 |
| 2006/0085666 A1* | 4/2006 | Stakutis et al. | ................... | 714/2 |
| 2008/0052328 A1* | 2/2008 | Widhelm et al. | ............. | 707/204 |

OTHER PUBLICATIONS

Mark Spiegel; Methods and Systems for Securely Managing File-Attribute Information for Files in a File System; U.S. Appl. No. 12/130,616, filed May 30, 2008.

* cited by examiner

*Primary Examiner* — Michael S McNally
(74) *Attorney, Agent, or Firm* — Advantedge Law Group

(57) ABSTRACT

A computer-implemented method for using property tables to perform non-iterative malware scans may include (1) obtaining at least one malware signature from a security software provider that identifies at least one property value for an item of malware, (2) accessing a property table for a computing device that identifies property values shared by one or more application packages installed on the computing device and, for each property value, each application package that shares the property value in question, and (3) determining, by comparing each property value identified in the malware signature with the property table, whether any of the application packages match the malware signature without having to iterate through the individual property values of each application package. Various other methods, systems, and computer-readable media are also disclosed.

20 Claims, 6 Drawing Sheets

Property Table
400

| 402 | 404 |
|---|---|
| PROPERTY VALUE | APPLICATION PACKAGE(S) |
| VALUE_1 | APK_3, APK_5, APK_6 |
| VALUE_2 | APK_1 |
| VALUE_3 | APK_2, APK_3 |
| VALUE_4 | APK_3, APK_6, APK_7 |
| VALUE_5 | APK_2 |

SYSTEMS AND METHODS FOR USING PROPERTY TABLES TO PERFORM NON-ITERATIVE MALWARE SCANS

BACKGROUND

Consumers and businesses face a growing tide of malicious software that threatens the stability and performance of their computers and the security of their data. For example, computer programmers with malicious intent have created and continue to create and propagate viruses, Trojans, spyware, worms, and other programs (collectively known as "malware") in an attempt to compromise computer systems.

Many providers of security software attempt to combat malware by creating and deploying malware signatures (i.e., data constructs that identify one or more properties or characteristics of a known item of malware) to their customers on a regular basis. Security software installed on the computing device of each customer may then use these deployed signatures to determine whether the customer's device contains malware by iterating through the individual properties or characteristics of each application package installed on the customer's device. For example, security software may scan a customer's device for malware by (1) identifying each application package installed on the customer's device and then, for each installed application package, (2) identifying relevant properties or characteristics of the installed application package and (3) determining whether the identified properties or characteristics of the installed application package match any of the sets of properties or characteristics contained in each of the deployed signatures.

Unfortunately, the length of time required to complete the above-described malware scan may be directly proportional to the number of application packages installed on a computing device, such that malware scans of devices having many installed application packages may take much longer to complete than scans of devices having few installed application packages. As such, the instant disclosure identifies a need for improved systems and methods for performing malware scans.

SUMMARY

As will be described in greater detail below, the instant disclosure generally relates to systems and methods for creating and updating a property table for a computing device that identifies unique property values shared by one or more application packages installed on the computing device in order to avoid having to iterate through the individual property values of each application package installed on the computing device. In one example, a computer-implemented method for performing such a task may include (1) obtaining at least one malware signature from a security software provider that identifies at least one property value for an item of malware, (2) accessing a property table for the computing device that identifies property values shared by one or more application packages installed on the computing device and, for each property value, each application package that shares the property value in question, and then (3) determining, by comparing each property value identified in the malware signature with the property table, whether any of the application packages match the malware signature without having to iterate through the individual property values of each application package.

In some embodiments, the above-recited method may include creating the property table prior to accessing the property table. The method may also include updating the property table by (1) detecting installation of at least one application package on the computing device, (2) identifying at least one property value of the application package, and then (3) updating the property table to indicate that the application package possesses the property value in question.

In one example, determining whether any of the application packages match the malware signature may include, for each property value identified in the malware signature, (1) searching the property table for the property value and then (2) retrieving, from the property table, a list of each application package that shares the property value. In another example, if the malware signature identifies a plurality of property values, then determining whether any of the application packages match the malware signature may also include identifying any application package that appears on each retrieved list.

The property table may be constructed in a variety of forms, including as a table within a relational database. In some examples, the property table may indicate that at least one unique property value is shared by a plurality of application packages installed on the computing device.

In some embodiments, the method may also include (1) identifying at least one application package installed on the computing device that matches the malware signature and then (2) performing a security action on the application package that matches the malware signature. In one example, the length of time required to determine whether any of the application packages match the malware signature may not be proportional to the number of application packages installed on the computing device.

In one embodiment, a system for implementing the above-described method may include a signature-retrieval module programmed to obtain at least one malware signature from a security software provider that identifies at least one property value for an item of malware. The system may also include a malware-detection module programmed to (1) access a property table for a computing device that identifies property values shared by one or more application packages installed on the computing device and, for each property value, each application package that shares the property value in question, and then (2) determine, by comparing each property value identified in the malware signature with the property table, whether any of the application packages match the malware signature without having to iterate through the individual property values of each application package.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) obtain at least one malware signature from a security software provider that identifies at least one property value for an item of malware, (2) access a property table for the computing device that identifies property values shared by one or more application packages installed on the computing device and, for each property value, each application package that shares the property value in question, and then (3) determine, by comparing each property value identified in the malware signature with the property table, whether any of the application packages match the malware signature without having to iterate through the individual property values of each application package.

As will be explained in greater detail below, by creating and updating a property table that identifies unique property values shared by one or more application packages installed on a computing device, the systems and methods described herein may enable security software to quickly identify matches for malware signatures without having to iterate through the individual property values of each and every application package installed on the computing device. Moreover, because this property table may contain entries that indicate that a plurality of installed application packages share or possess the same property value, the length of time required to perform such scans may no longer be proportional to the number of installed application packages, potentially resulting in a significant decrease in the amount of time required to perform these scans. Finally, because of this speed advantage and because the size of these property tables may be much smaller than traditional property value caches, the systems and methods described herein may be particularly useful or applicable on computing systems with limited computing resources, such as mobile computing devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary property table.

Figure 1:
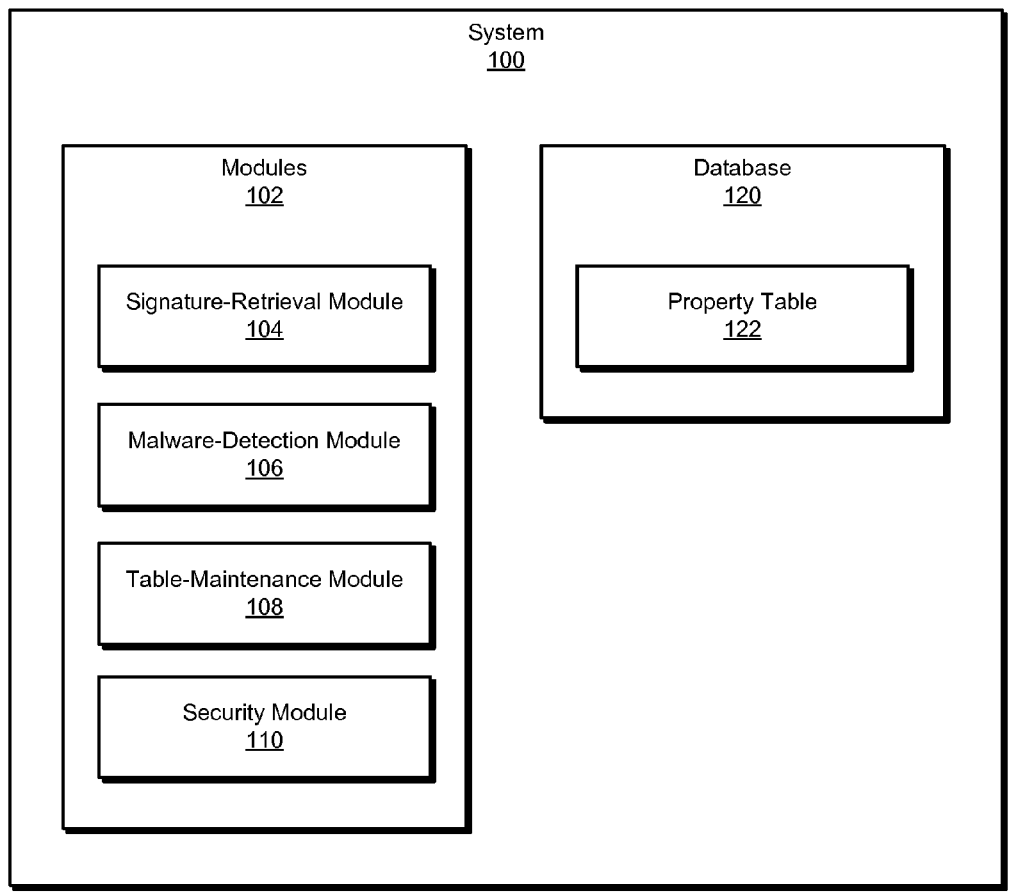
FIG. 1 is a block diagram of an exemplary system for using property tables to perform non-iterative malware scans.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
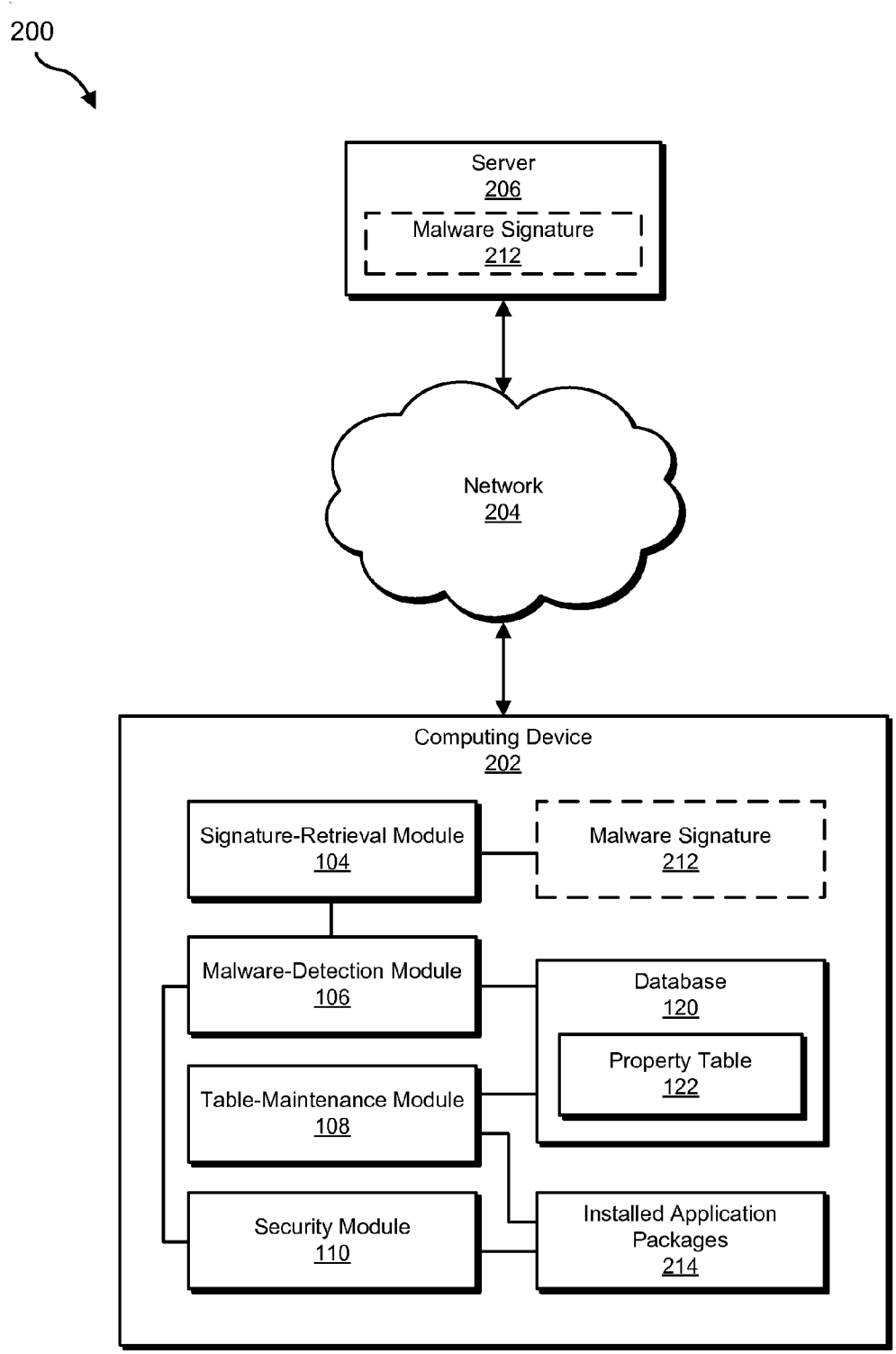
FIG. 2 is a block diagram of an exemplary system for using property tables to perform non-iterative malware scans.

The following will provide, with reference to FIGS. 1-2, detailed descriptions of exemplary systems for using property tables to perform non-iterative malware scans. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for using property tables to perform non-iterative malware scans. As illustrated in this figure, exemplary system 100 may include one or more modules 102 for performing one or more tasks. For example, and as will be explained in greater detail below, exemplary system 100 may include a signature-retrieval module 104 programmed to obtain at least one malware signature from a security software provider that identifies at least one property value for an item of malware. Exemplary system 100 may also include a malware-detection module 106 programmed to (1) access a property table that identifies property values shared by one or more application packages installed on a computing device and, for each property value, each application package that shares the property value in question, and then (2) determine, by comparing each property value identified in the malware signature with the property table, whether any of the application packages match the malware signature.

In addition, and as will be described in greater detail below, exemplary system 100 may include a table-maintenance module 108 programmed to create or update the property table. Exemplary system 100 may also include a security module 110 programmed to identify and perform a security action on an application package that matches the malware signature. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 (which may, for example, represent a relational database) may be configured to store property table 122. Database 120 may represent portions of a single database or computing device or a plurality of databases or computing devices. For example, database 120 may represent a portion of computing device 202 and/or server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 and/or server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, enable computing device 202 to use property tables to perform non-iterative malware scans. For example, and as will be described in greater detail below, one or more of modules 102 may cause computing device 202 to (1) obtain at least one malware signature (e.g., malware signature 212) from a security software provider that identifies at least one property value for an item of malware, (2) access a property table (e.g., property table 122) that identifies property values shared by one or more application packages installed on computing device 202 (e.g., installed application packages 214) and, for each property value, each application package that shares the property value in question, and then (3) determine, by comparing each property value identified in the malware signature with the property table, whether any of the application packages match the malware signature without having to iterate through the individual property values of each application package.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of providing malware signatures. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
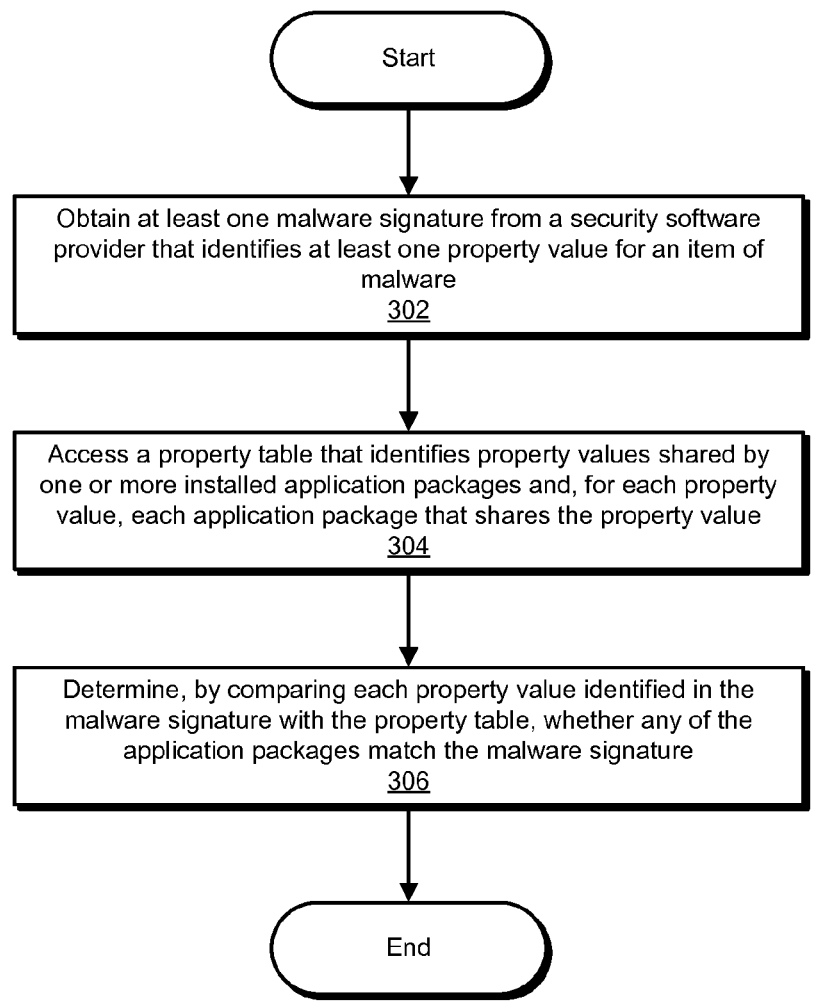
FIG. 3 is a flow diagram of an exemplary method for using property tables to perform non-iterative malware scans.

FIG. 3 is a flow diagram of an exemplary computer-implemented method 300 for using property tables to perform non-iterative malware scans. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 the systems described herein may obtain at least one malware signature from a security software provider. For example, signature-retrieval module 104 may, as part of computing device 202 in FIG. 2, obtain malware signature 212 from a security software provider.

The term "malware signature," as used herein, generally refers to any type or form of data construct that may be used to identify an item of malware based on one or more characteristics or properties of the item of malware. In some examples, a malware signature may identify one or more properties or characteristics of a known item of malware. Examples of the types of properties or characteristics of an item of malware (such as a malicious file) that a malware signature may identify include, without limitation, a hash that uniquely identifies the file, the file's name, the file's installation path, the file's size, data objects that are generated or referenced by the file (such as, e.g., string constants, class names, variable names, or the like), or any other type or form of statically observable property or characteristic of the file.

The systems described herein may perform step 302 in a variety of ways. In one example, signature-retrieval module 104 may obtain malware signature 212 by downloading the same from a server (e.g., server 206) operated by a security software provider. In another example, signature-retrieval module 104 may retrieve malware signature 212 from physical media (e.g., a DVD or flash drive) connected to computing device 202. In some examples, malware signature 212 may be included within a new or updated malware definition set provided by a security software provider that includes a plurality of malware signatures.

In step 304, the systems described herein may access a property table for the computing device in question. For example, malware-detection module 106 may, as part of computing device 202 in FIG. 2, access a property table 122 for computing device 202.

In some examples, the property table accessed in step 304 may identify property values shared by one or more application packages installed on a computing device and, for each property value, each application package that shares this property value. FIG. 4 provides an illustration of an exemplary property table 400. As illustrated in this figure, column 402 within property table 400 may represent a list of various property values (e.g., "VALUE_1," "VALUE_2," and so on) for application packages installed on computing device 202 (e.g., installed application packages 214). In one example, column 402 within property table 400 may only contain a single entry for each unique property value. In other words, even if two or more application packages installed on computing device 202 possess or share the same property value, column 402 within property table 400 may only contain a single entry for this property value.

In the example illustrated in FIG. 4, property table 400 may also include a column 404 that identifies the application packages installed on computing device 202 that share or possess the property values identified in column 402. For example, column 404 may indicate that the application packages "APK_3," "APK_5" and "APK_6" each share or possess the property value "VALUE_1."

In some examples, the property table accessed in step 304 may contain property values for each and every application package installed on the computing device in question. In other examples, this property table may only contain property values for a specific subset of application packages installed on the computing device. Examples of such subsets include, without limitation, user-installed application packages, application packages that originated from a specific source (e.g., application packages that were downloaded via an Internet browser, received in an email communication, retrieved from physical media, originated from a specific URL, or the like), application packages installed on, before, or after a specific date or time, and/or any other potentially interesting or useful grouping or subset of application packages.

The systems described herein may create or update the property table accessed in step 304 in a variety of ways. In one example, the systems described herein may update or create a property table for a computing device by (1) detecting the installation of at least one application package on the computing device, (2) identifying at least one property value of the application package, and then (3) creating or updating a property table that specifies or indicates that the application package possesses the property value in question. For example, table-maintenance module 108 may monitor computing device 202 for new application package installations. If table-maintenance module 108 detects the installation of an application package, then table-maintenance module 108 may (by, e.g., performing a static analysis of the installed application package's code) identify one or more properties or characteristics of the installed application package. If table-maintenance module 108 then determines that a property value of the installed application (e.g., "VALUE_1") package is already identified within column 402 of property table 400, then table-maintenance module 108 may simply update column 404 to indicate that the installed application package possesses or shares the property value in question (by, e.g., adding a unique identifier for the installed application package to the entry within column 404 adjacent the entry within column 402 for the property value in question).

In contrast, if table-maintenance module 108 determines that property table 400 does not already contain an entry for an identified property value of the installed application package, then table-maintenance module 108 may create an entry within column 402 of property table 400 that uniquely identifies the property value in question. Table-maintenance module 108 may then also create an entry within column 404 adjacent the newly created entry within column 402 that uniquely identifies the installed application package.

The property table accessed in step 304 may represent any type or form of data structure sufficient to identify relationships between property values and installed application packages that possess or share such property values. In one example, this property table may represent a property table within a local or remote relational database, such as an SQL database. In this example, the systems described herein may create one or more database indices for the property table in order to improve the speed of data retrieval operations performed on the property table.

Returning to FIG. 3, at step 306 the systems described herein may determine, by comparing each property value identified in the malware signature obtained in step 302 with the property table accessed in step 304, whether any of the application packages installed on the computing device match the malware signature. For example, malware-detection module 106 may, as part of computing device 202 in FIG. 2, use property table 122 to determine whether any of installed application packages 214 match malware signature 212.

The systems described herein may perform step 306 in a variety of ways. In one example, the systems described herein may determine whether any of the application packages installed on the computing device match the malware signature obtained in step 302 by, for each property value identified in the malware signature, (1) searching the property table for the property value and then (2) retrieving a list of each application package that shares the property value from the property table. For example, malware-detection module 106 may, for each property value identified within malware signature 212, determine whether any of installed application packages 214 possess this particular property value by querying or searching property table 400 for an entry within column 402 that matches the property value in question. If an entry for the property value in question exists within column 402 in property table 400, then malware-detection module 106 may retrieve a list of each application package that shares or possesses this property value from column 404 within property table 400. For example, if malware signature 212 identifies the property value "VALUE_1," then malware-detection module 106 may obtain from property table 400 a list that indicates that application packages "APK_3," "APK_5," and "APK_6" installed on computing device 202 possess or share property value "VALUE_1."

If the malware signature obtained in step 302 only identifies a single property value (e.g., if the malware signature merely represents a hash for a blacklisted or known-malicious file), then the systems described herein may identify a match for this malware signature by simply identifying installed application packages that possess the property value in question (e.g., installed application packages that match the hash of the blacklisted file).

However, if the malware signature obtained in step 302 identifies a plurality of property values for an item of malware, then the systems described herein may determine whether any of the installed application packages match the malware signature by (1) retrieving, from the property table, a list of each application package that shares or possesses each property value identified in the malware signature and then (2) identifying any application package that appears on each of these retrieved lists. For example, if malware signature 212 contains information that identifies the property values "VALUE_3" and "VALUE_5," then malware-detection module 106 may retrieve from property table 400 a list for each of these property values that identifies each application package installed on computing device 202 that shares or possesses the property value in question. For example, malware-detection module 106 may retrieve from property table 400 (1) a list that indicates that application packages "APK_2" and "APK_3" possess or share the property value "VALUE_3" and (2) a list that indicates that application package "APK_2" possesses the property value "VALUE_5." In this example, malware-detection module 106 may identify any matches for malware signature 212 by identifying intersecting data points between the retrieved lists. For example, malware-detection module 106 may determine that application package "APK_2" matches malware signature 212 (and thus represents malware) since this application package possesses each of the property values identified within malware signature 212.

In some examples, the systems described herein may perform a security action on each application package installed on the computing device that matches the malware signature obtained in step 302. For example, if malware-detection module 106 determines that application package "APK_2" matches malware signature 212, then security module 110 may, as part of computing device 202 in FIG. 2, perform a security action on application package "APK_2." Examples of such security actions include, without limitation, uninstalling, deleting, removing, and/or quarantining the installed application package, notifying a security software provider that the installed application package matches the malware signature, notifying a user of the computing device that the installed application package matches the malware signature, and/or any other potential action that may remediate the potential security issue posed by the installed application package.

As detailed above, by creating and updating a property table that identifies unique property values shared by one or more application packages installed on a computing device, the systems and methods described herein may enable security software to quickly identify matches for malware signatures without having to iterate through the individual property values of each and every application package installed on the computing device. Moreover, because this property table may contain entries that indicate that a plurality of installed application packages share or possess the same property value, the length of time required to perform such scans may no longer be proportional to the number of installed application packages, potentially resulting in a significant decrease in the amount of time required to perform these scans. Finally, because of this speed advantage and because the size of these property tables may be much smaller than traditional property value caches, the systems and methods described herein may be particularly useful or applicable on computing systems with limited computing resources, such as mobile computing devices.

Figure 5:
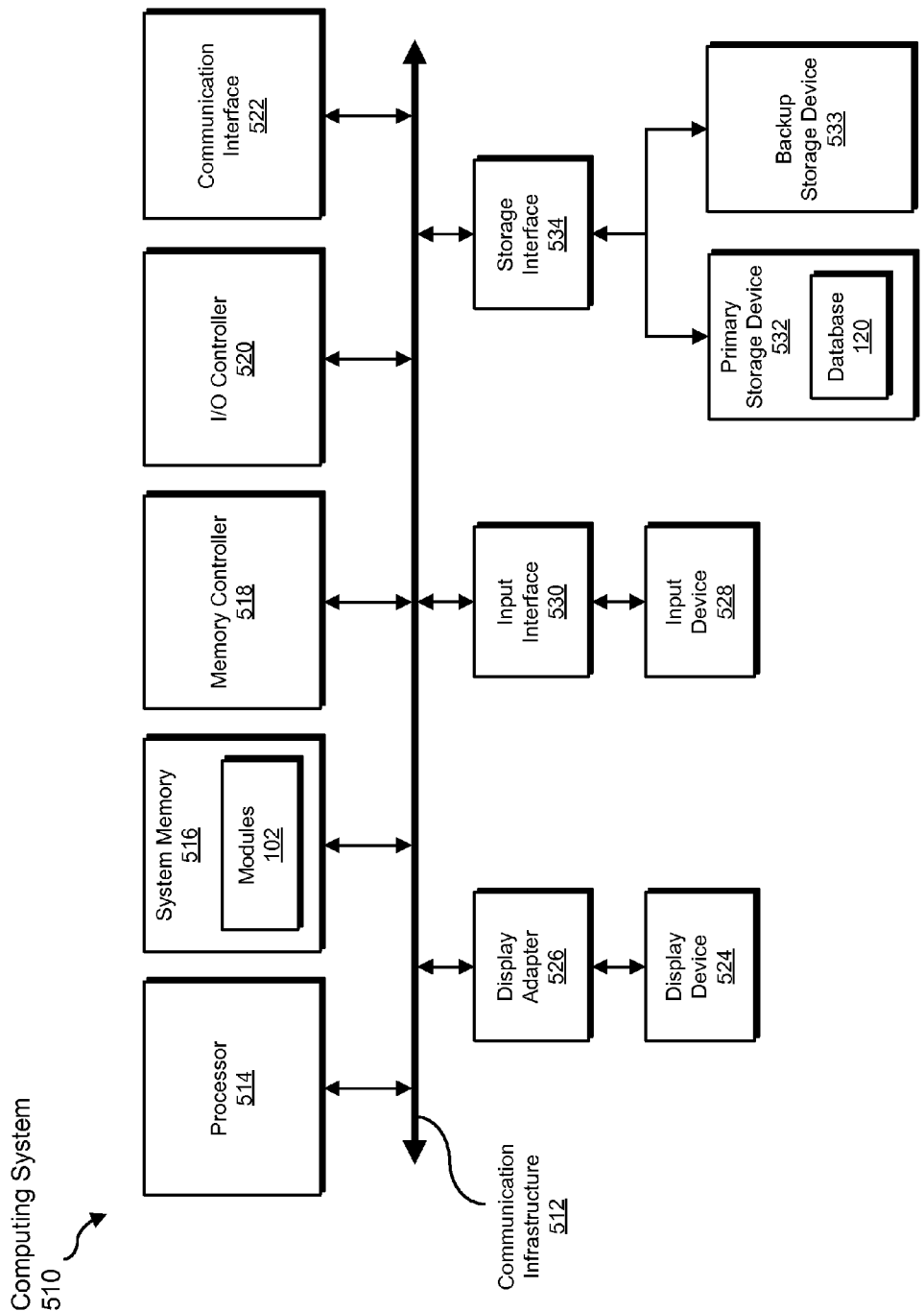
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the obtaining, accessing, determining, comparing, creating, updating, detecting, identifying, searching, retrieving, and performing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
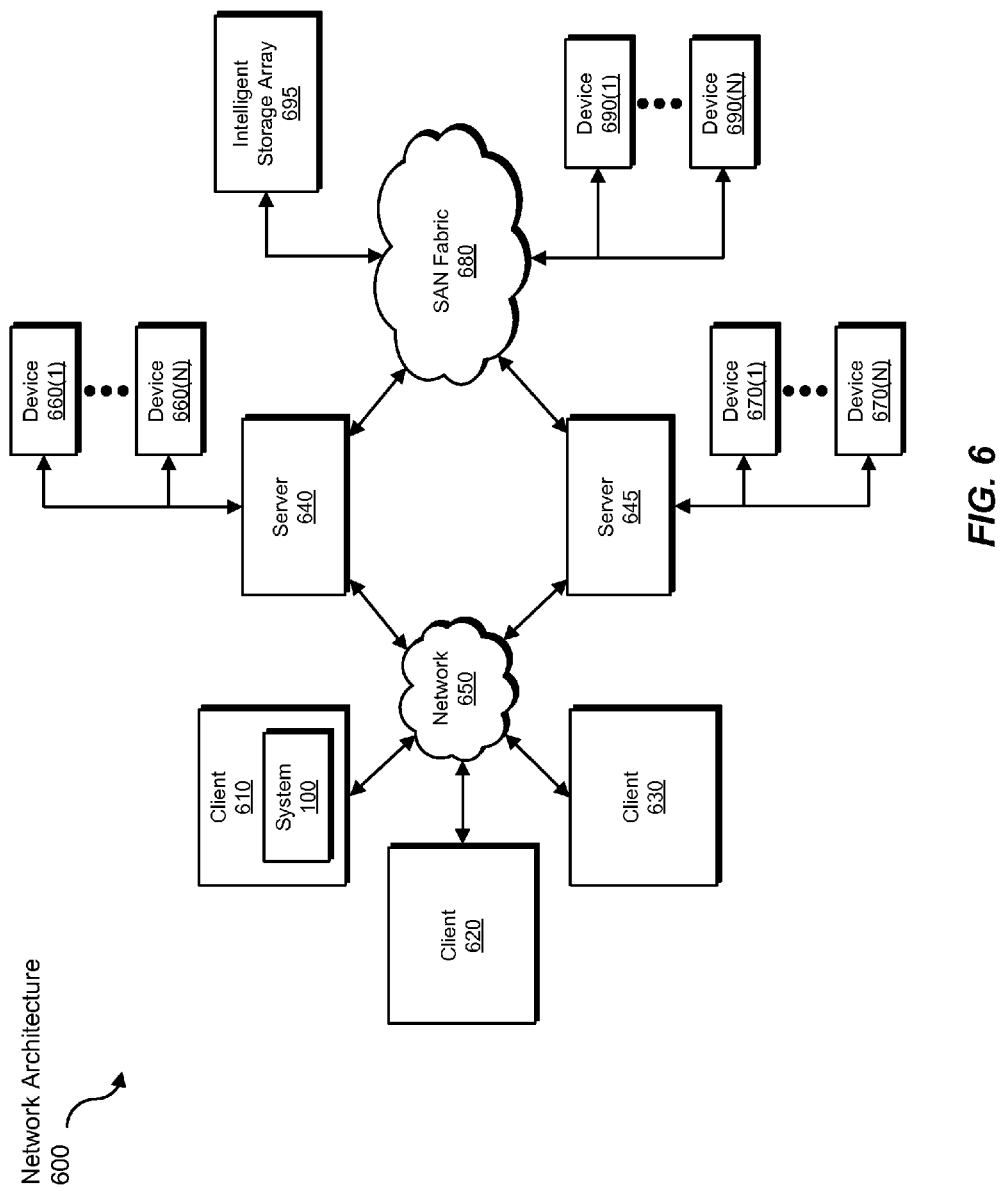
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the obtaining, accessing, determining, comparing, creating, updating, detecting, identifying, searching, retrieving, and performing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for using property tables to perform non-iterative malware scans.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device that is capable of using property tables to perform non-iterative malware scans.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using property tables to perform non-iterative malware scans, at least a portion of the method being performed by a computing device comprising at least one processor, the method comprising:
    obtaining at least one malware signature from a security software provider, wherein the malware signature identifies at least one property value for an item of malware;
    accessing a property table for the computing device that identifies:
        property values shared by one or more application packages installed on the computing device;
        for each property value, each application package that shares the property value in question;
    determining, by comparing each property value identified in the malware signature with the property table, whether any of the application packages match the malware signature without having to iterate through the individual property values of each application package.

2. The method of claim 1, further comprising, prior to accessing the property table, creating the property table.

3. The method of claim 1, further comprising updating the property table by:
    detecting installation of at least one application package on the computing device;
    identifying at least one property value of the application package;
    updating the property table to indicate that the application package possesses the property value in question.

4. The method of claim 1, wherein determining whether any of the application packages match the malware signature comprises, for each property value identified in the malware signature:
    searching the property table for the property value;
    retrieving, from the property table, a list of each application package that shares the property value.

5. The method of claim 4, wherein the malware signature identifies a plurality of property values and determining whether any of the application packages match the malware signature further comprises identifying any application package that appears on each retrieved list.

6. The method of claim 1, wherein the property table indicates that at least one unique property value is shared by a plurality of application packages installed on the computing device.

7. The method of claim 1, wherein the property table comprises a table within a relational database.

8. The method of claim 1, wherein the length of time required to determine whether any of the application packages match the malware signature is not proportional to the number of application packages installed on the computing device.

9. The method of claim 1, further comprising:
    identifying at least one application package installed on the computing device that matches the malware signature;
    performing a security action on the application package that matches the malware signature.

10. A system for using property tables to perform non-iterative malware scans, the system comprising:
- a signature-retrieval module programmed to obtain at least one malware signature from a security software provider, wherein the malware signature identifies at least one property value for an item of malware;
- a malware-detection module programmed to:
  - access a property table for a computing device that identifies property values shared by one or more application packages installed on the computing device and, for each property value, each application package that shares the property value in question;
  - determine, by comparing each property value identified in the malware signature with the property table, whether any of the application packages match the malware signature without having to iterate through the individual property values of each application package;
- at least one processor configured to execute the signature-retrieval module and the malware-detection module.

11. The system of claim 10, further comprising a table-maintenance module programmed to create the property table.

12. The system of claim 10, further comprising a table-maintenance module programmed to update the property table by:
- detecting installation of at least one application package on the computing device;
- identifying at least one property value of the application package;
- updating the property table to indicate that the application package possesses the property value in question.

13. The system of claim 10, wherein the malware-detection module determines whether any of the application packages match the malware signature by, for each property value identified in the malware signature:
- searching the property table for the property value;
- retrieving, from the property table, a list of each application package that shares the property value.

14. The system of claim 13, wherein the malware signature identifies a plurality of property values and the malware-detection module determines whether any of the application packages match the malware signature further by identifying any application package that appears on each retrieved list.

15. The system of claim 10, wherein the property table indicates that at least one unique property value is shared by a plurality of application packages installed on the computing device.

16. The system of claim 10, wherein the property table comprises a table within a relational database.

17. The system of claim 10, wherein the length of time required by the malware-detection module to determine whether any of the application packages match the malware signature is not proportional to the number of application packages installed on the computing device.

18. The system of claim 10, further comprising a security module programmed to:
- identify at least one application package installed on the computing device that matches the malware signature;
- perform a security action on the application package that matches the malware signature.

19. A computer-readable-storage device comprising one or more computer-executable instructions that, when executed by at least one processor of a computing device, cause the computing device to:
- obtain at least one malware signature from a security software provider, wherein the malware signature identifies at least one property value for an item of malware;
- access a property table for the computing device that identifies:
  - property values shared by one or more application packages installed on the computing device;
  - for each property value, each application package that shares the property value in question;
- determine, by comparing each property value identified in the malware signature with the property table, whether any of the application packages match the malware signature without having to iterate through the individual property values of each application package.

20. The computer-readable-storage device of claim 19, wherein the computer-executable instructions, when executed by the processor of the computing device, further cause the computing device to update the property table by:
- detecting installation of at least one application package on the computing device;
- identifying at least one property value of the application package;
- updating the property table to indicate that the application package possesses the property value in question.

* * * * *